United States Patent
Wheeler

Patent Number: 6,101,048
Date of Patent: Aug. 8, 2000

[54] SPLIT FIELD WIDE ANGLE VIEWING SYSTEM FOR VEHICLES

[75] Inventor: Bryce A. Wheeler, Mammoth Lakes, Calif.

[73] Assignee: Raytheon Company, Lexington, Mass.

[21] Appl. No.: 09/081,854

[22] Filed: May 19, 1998

[51] Int. Cl.[7] .................................................. G02B 3/08
[52] U.S. Cl. ........................ 359/742; 359/726; 359/837
[58] Field of Search .................................. 359/742, 678, 359/854, 855, 838, 839, 866, 480, 404, 403

[56] References Cited

U.S. PATENT DOCUMENTS

| | | | |
|---|---|---|---|
| 4,439,021 | 3/1984 | Gross | 350/452 |
| 5,594,593 | 1/1997 | Milner | 359/726 |
| 5,594,594 | 1/1997 | Ung | 359/855 |

*Primary Examiner*—Georgia Epps
*Assistant Examiner*—Timothy J Thompson

*Attorney, Agent, or Firm*—Colin M. Raufer; Leonard A. Alkov; Glenn H. Lenzen, Jr.

[57] ABSTRACT

A side-viewing optical system that provides wide-field viewing of image scenes on both sides of a vehicle, particularly in blind areas between the driver's direct peripheral vision and a image scene normally viewed using the rear view mirror. A projected demagnified image from both sides of the vehicle is directed into the driver's eyes from a position straight forward and angled downward so that the forward viewing direction is not blocked while driving the vehicle or requiring driver head motion. The system has left and right side viewers having prisms and Fresnel relay lenses. A roof mirror having left and right mirror surfaces respectively reflect image scenes observed by the side viewers toward the driver. A relay is disposed between the right side viewer and the right mirror surface of the roof mirror. A projector having a Fresnel lens finally projects the image scenes toward the driver for viewing.

8 Claims, 6 Drawing Sheets

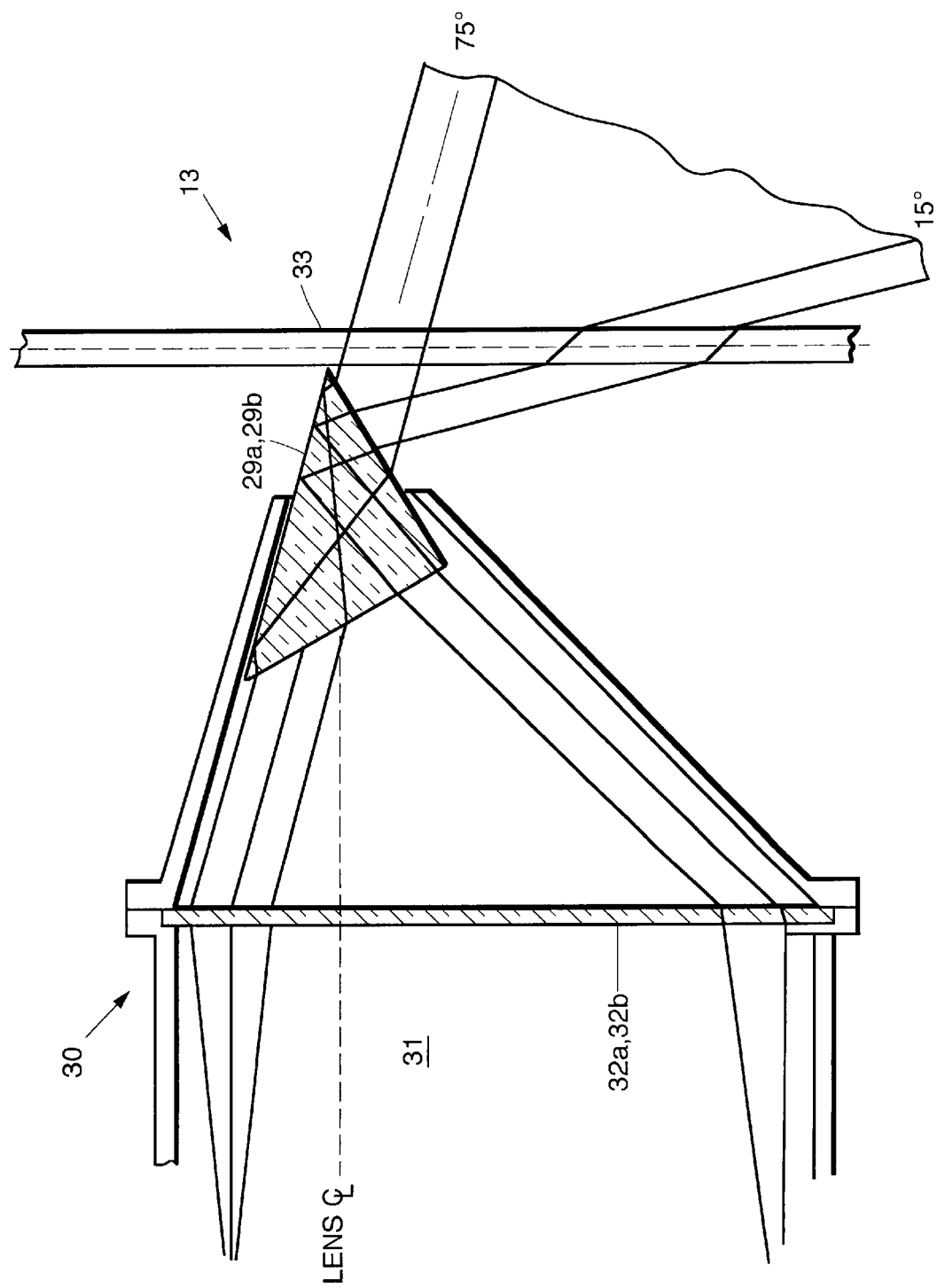

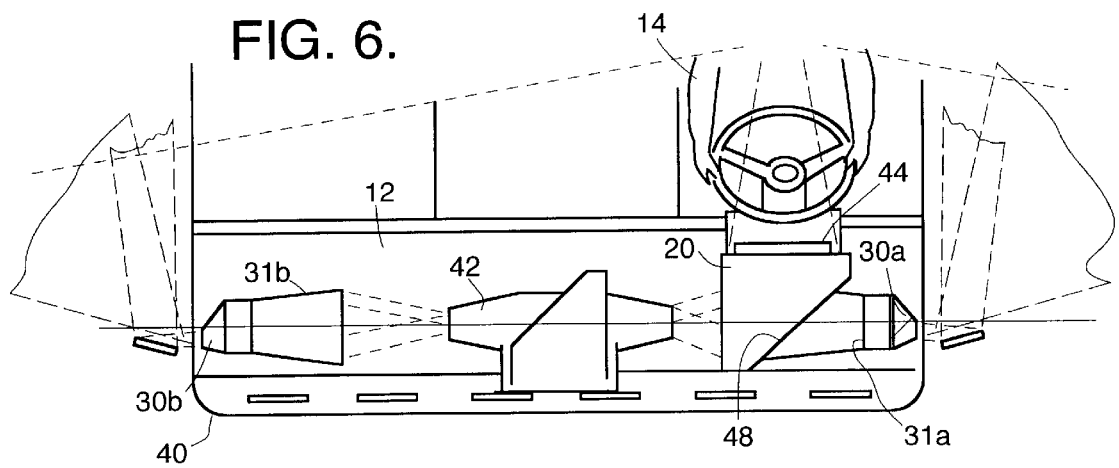
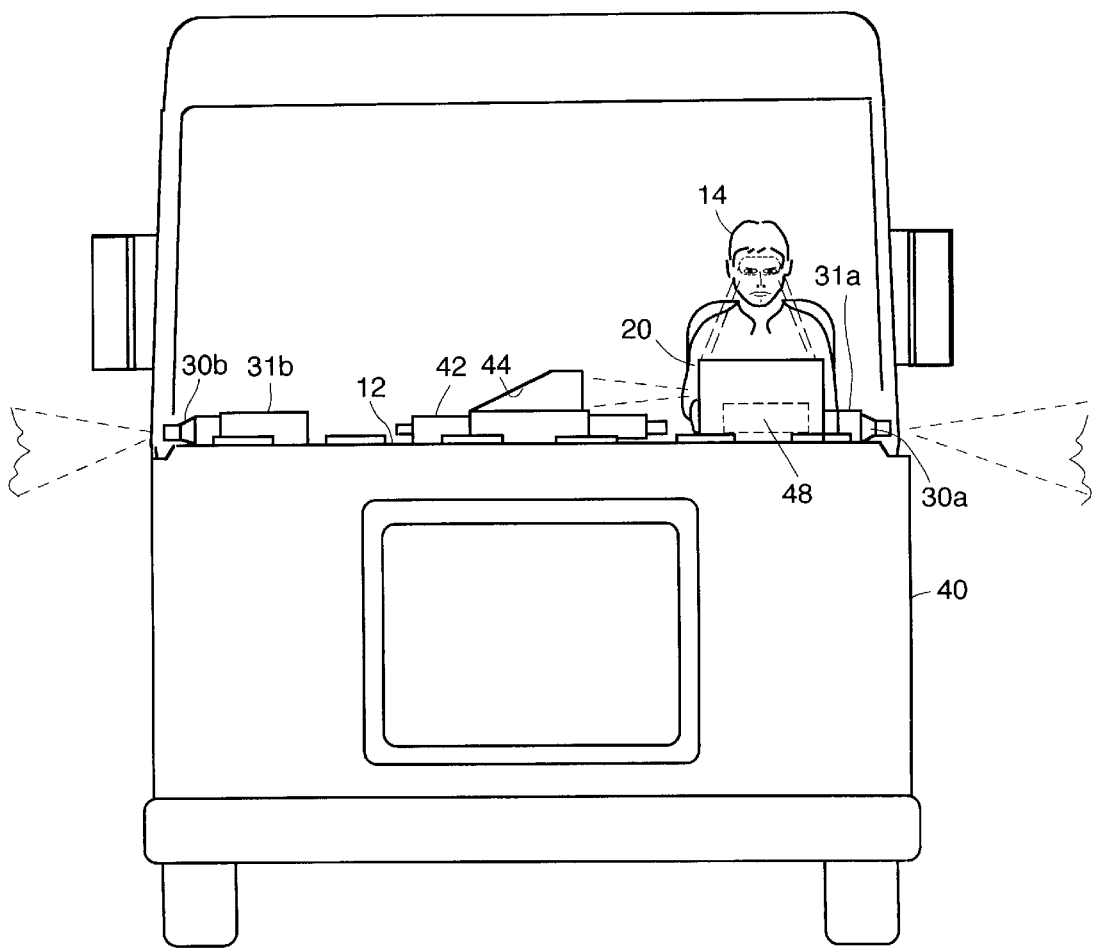

SPLIT FIELD WIDE ANGLE VIEWING
SYSTEM FOR VEHICLES

BACKGROUND

The present invention relates generally to optical systems for use in vehicles, and more particularly, to improved side viewing optical systems for use in vehicles, such as cars, busses, trucks and boats, and the like.

Substantially all currently produced passenger vehicles and busses have two or three mirrors that are used to view behind or on the side of the vehicle. However, "blind areas" located on the left and right sides of the vehicles are relatively difficult to see. Some drivers use the interior windshield-mounted rear view mirror to view to the rear of the vehicle, while the side view mirrors are aimed at the blind areas. However, if the mirror is planar, such as is typically the case for the driver's side mirror, the complete side of the vehicle cannot be seen even if the mirror is aimed at what is believed to be the blind area. Furthermore, because the blind area is actually relatively large in some cases, not all vehicles are visible in a side view mirror that is aimed at the blind area. In some cases, right side mirrors are convex which provides a greater viewing angle when viewing the side of the vehicle. However, concave mirrors cause the image in the mirror to be smaller and the location of any vehicle seen in the concave side view mirror is closer than it appears to be, which is potentially dangerous if one wishes to change lanes to the right. For these reasons, a concave side view mirror is not used on the driver's side of the vehicle.

More particularly, convex rear view mirrors, side and interior-mounted mirrors, have been conventionally used to provide an improved view of the side of the vehicle. Also, wide-angle Fresnel lenses bonded on rear windows of cars and campers have been widely used to provide an improved view of the side of the vehicle. Even though these popular devices somewhat increase the angular scene coverage, they all require head rotation away from the normal driving position for viewing and are frequently obscured by car structures and objects in the vehicle.

Therefore, it would be an advantage to have a side viewing system for use in passenger vehicles and busses that permit viewing of a wider field of view that fully encompasses the driver's blind areas and makes it visible to the driver. Accordingly, it is an objective of the present invention to provide for improved side-viewing optical systems for use in vehicles, such as cars, busses, trucks and boats, and the like.

SUMMARY OF THE INVENTION

To meet the above and other objectives, the present invention provides for sideviewing optical systems that provides wide-field viewing of objects on both sides of a vehicle, particularly in blind areas between the driver's direct peripheral vision and image scenes normally viewed by conventional rear view mirrors. A projected demagnified image from both sides of the vehicle is directed into the driver's eyes from a position straight forward and angled downward so that the forward viewing direction is not blocked while driving the vehicle or requiring driver head motion.

The system has left and right side viewers having prisms and Fresnel relay lenses. A roof mirror having left and right mirror surfaces respectively reflect image scenes observed by the side viewers toward the driver. A relay is disposed between the right side viewer and the right mirror surface of the roof mirror. A collimating element comprising a Fresnel lens finally projects the image scenes toward the driver for viewing.

The present system uses a plurality of Fresnel lenses, prisms, and planar mirrors, that view image scenes on both sides of a vehicle and provide side-by-side projection of both image scenes to the driver at a position directly forward of the driver. Therefore, head turning from a normal forward-looking driving position is not required. Using the present invention, the driver is continually made aware of stationary and moving objects surrounding the vehicle without compromising his or her forward viewing concentration that is normally required for safe driving, as is encountered using conventional side view mirrors. The present invention may be used to replace conventional side view mirrors.

BRIEF DESCRIPTION OF THE DRAWINGS

The various features and advantages of the present invention may be more readily understood with reference to the following detailed description taken in conjunction with the accompanying drawings, wherein like reference numerals represent like structural elements, and in which

FIG. 4 is a full size view of the side viewer of the system of FIG. 1;

FIG. 5 illustrates a front end view of a second embodiment of a wide angle side viewing system in accordance with the principles of the present invention installed in a bus;

FIG. 6 illustrates a top view of the viewing system of FIG. 5; and

DETAILED DESCRIPTION

Figure 1:
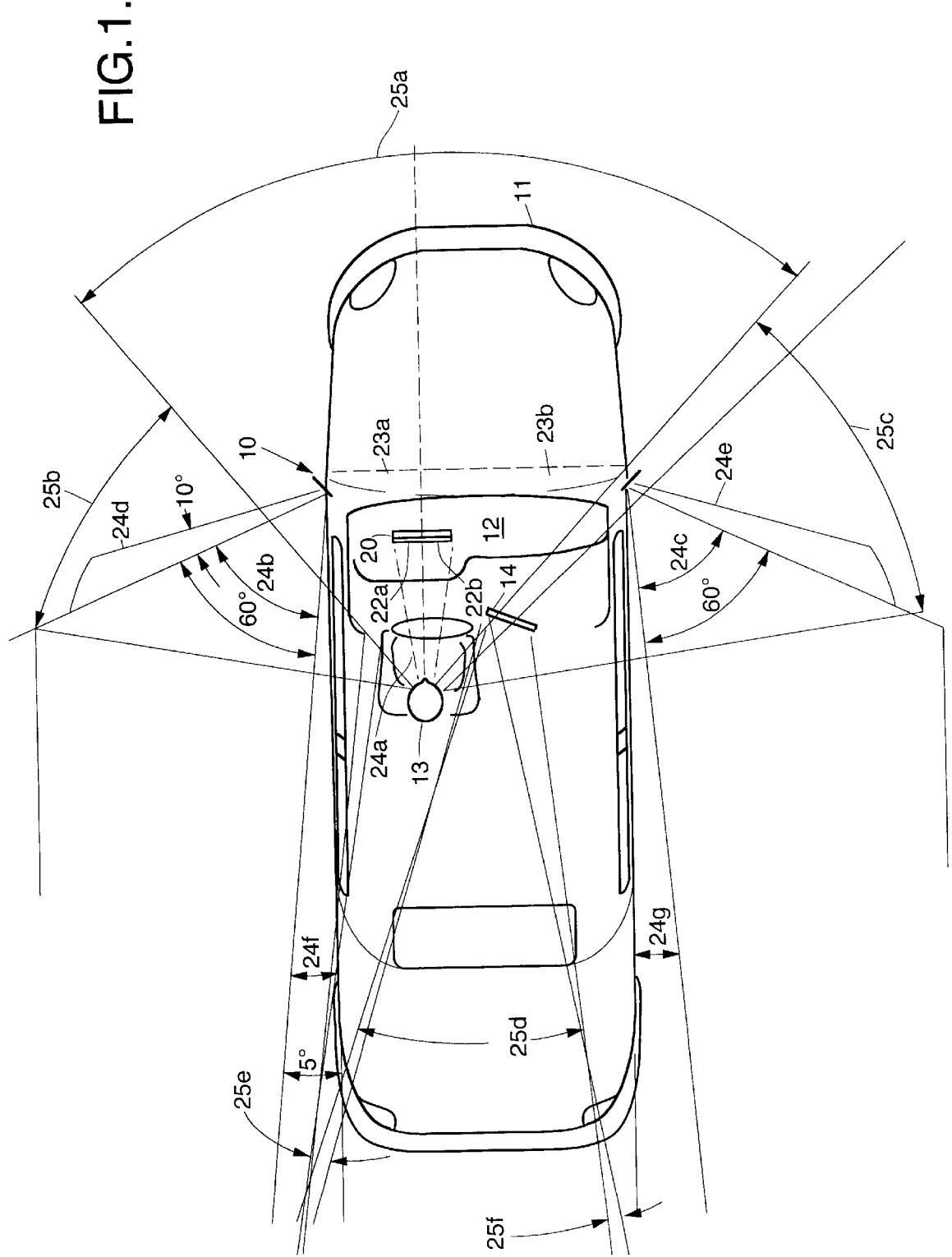
FIG. 1 illustrates a top view of a first embodiment of a wide angle side viewing system in accordance with the principles of the present invention installed in a passenger vehicle.
Figure 2:
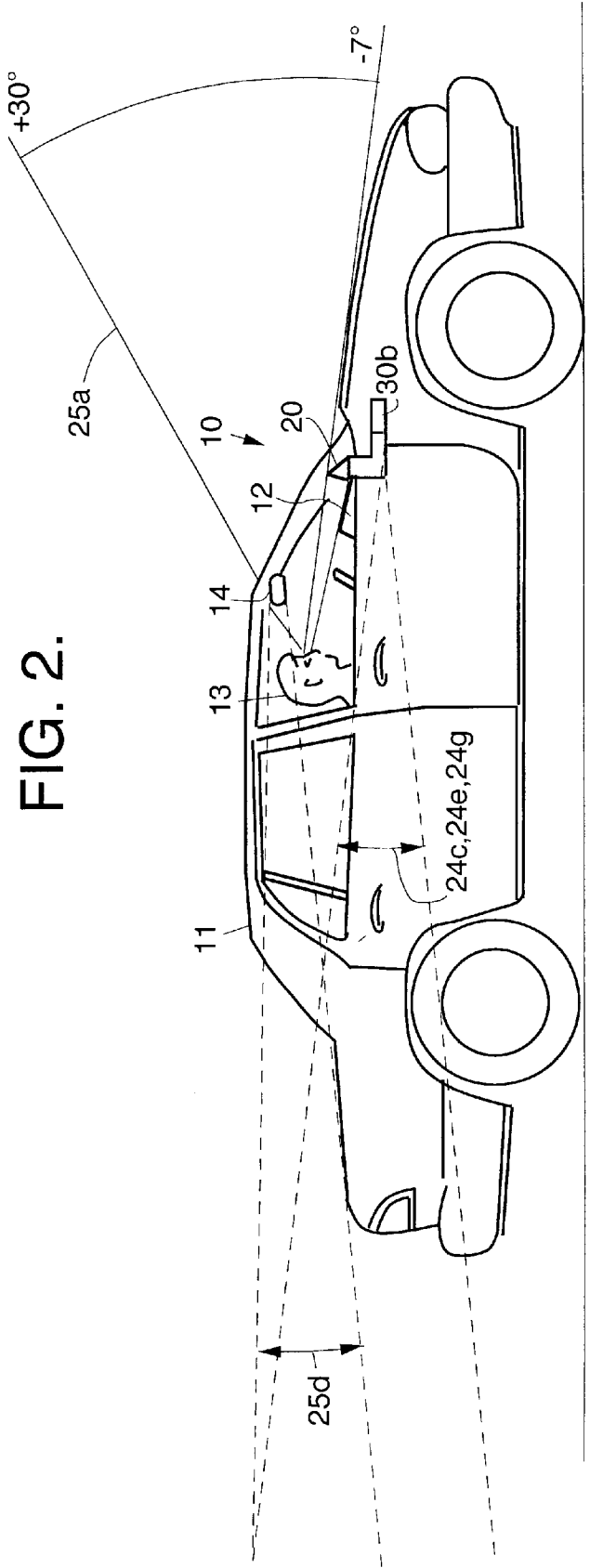
FIG. 2 illustrates a side view of the viewing system of FIG. 1.

Referring to the drawing figures, FIG. 1 illustrates a top view of a first embodiment of a wide angle, side viewing system 10 in accordance with the principles of the present invention installed in a passenger vehicle 1. FIG. 2 illustrates a side view of the viewing system 10 of FIG. 1 from the right side of the vehicle 11. The side viewing system 10 is comprised of a side viewer projector 20 and left and right side viewers 30a, 30b.

The projector 20 is disposed adjacent a dashboard 12 of the vehicle 11. The projector 20 comprises left and right optical sections 22a, 22b that project left and right images, respectively, derived from the left and right side viewers 30a, 30b to a driver 13 of the vehicle 11. The projector 20 is disposed in front of the driver 13 of the vehicle 11 and may protrude above the dashboard 12, for example.

Left and right optical paths 23a, 23b are provided from the projector 20 downward and then forward and then leftward and rightward, respectively, to the left and right side viewers 30a, 30b. This is shown more clearly and will be discussed in detail with regard to FIGS. 3a and 3b. The projector 20 projects a one-sixth magnification, 20° apparent field of view 24a of left and right image scenes to the driver 13. The left side viewer 30a provides a central 60° wide by ±6° high, one-sixth magnification, biocular field of view 24b for the driver 13 to the left of the vehicle 11. The right side viewer 30b also provides a 60° wide by ±6° high, one-sixth magnification, biocular field of view 24c for the driver 13 to the right of the vehicle 11.

The left and right side viewers 30a, 30b provide a 10° one-sixth magnification, monocular fields of view 24d, 24e beyond the central biocular field of view 24b, 24c and lateral to the vehicle 11. In addition, the left and right side viewers 30a, 30b provide 5° one-sixth magnification, monocular fields of view 24f, 24g, respectively, adjacent sides of the vehicle 11 between the central biocular field of view 24b, 24c and each side of the vehicle 11.

The use of the present wide angle, side viewing system 10 in conjunction with a conventional windshield-mounted rear view mirror 14, for example, provides the driver 13 with complete awareness of the entire area surrounding the vehicle 11. In particular, the driver's normal forward vision provides about a 90° direct biocular field of view 25a at unity power, along with 40° left and right peripheral fields of view 25b, 25c. The conventional windshield-mounted rear view mirror 14 provides about a 24° unity power field of view 25d to the rear of the vehicle 11 along which includes 3° monocular fields of view 25e, 25f to the left and right of the rear biocular field of view 25d. The present system 10 provides the remaining field coverage by providing 75° fields of view to the left and right of the vehicle 11 which overlaps the forward left and right peripheral fields of view 25b, 25c of the driver 13 and the rear field of view 25d provided by the rear view mirror 14.

Figure 3A:
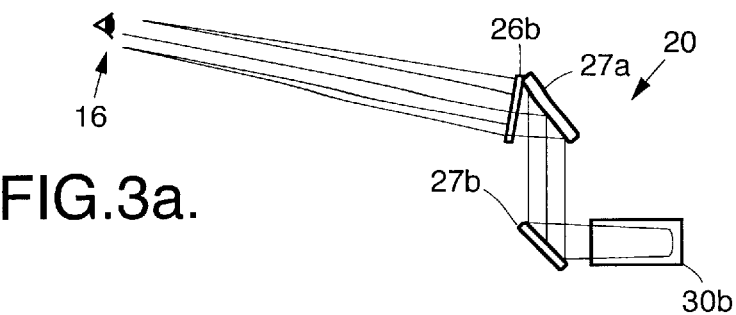
FIGS. 3a and 3b optical schematics illustrating side and top views, respectively, of the viewing system of FIG. 1.
Figure 3B:
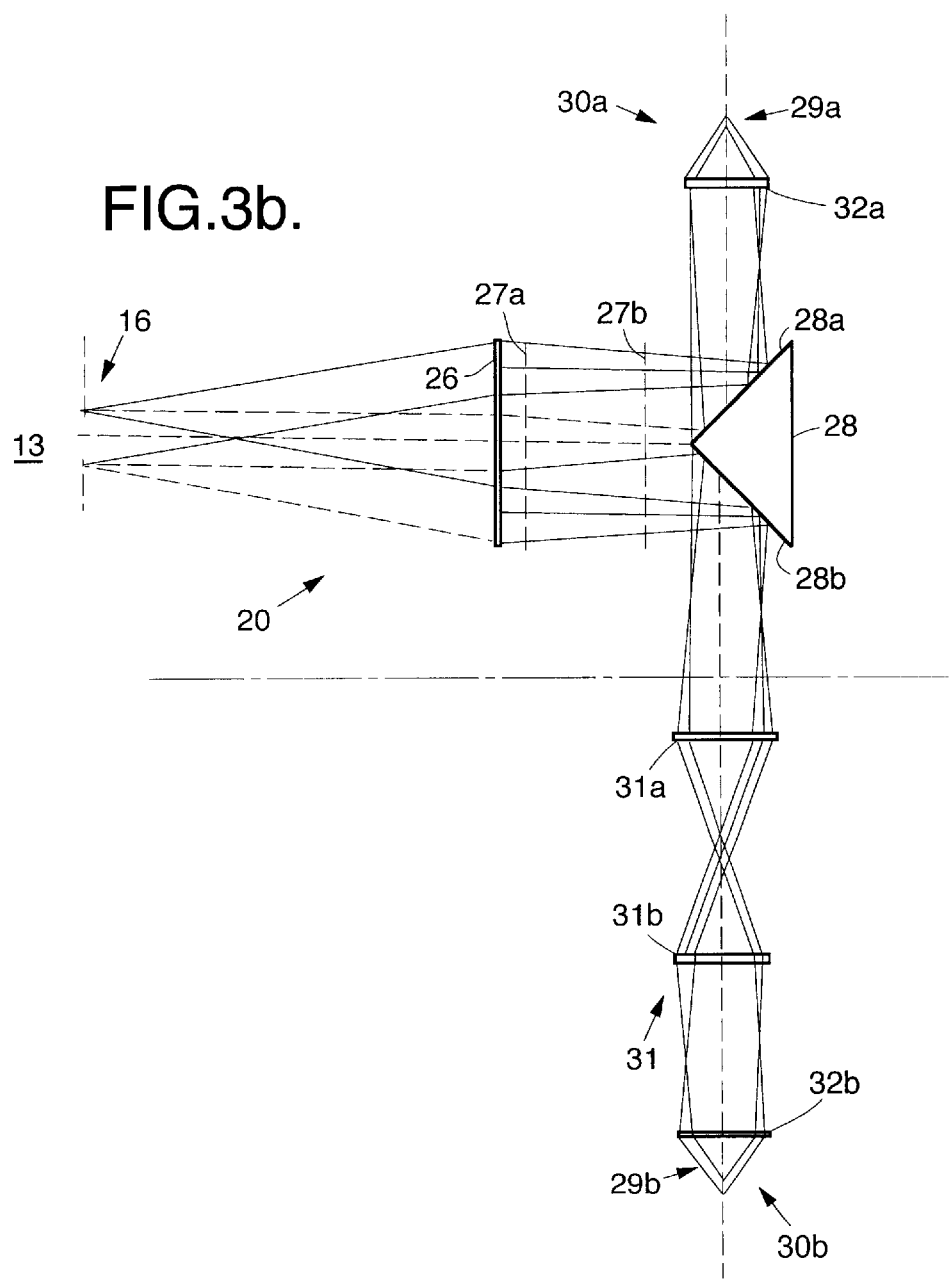

To better understand the present invention, reference is made to FIGS. 3a and 3b, which show optical schematics illustrating side and top views, respectively, that show internal details of the viewing system 10 of FIG. 1. The projector 20 comprises a Fresnel lens 26 that is used to project the image scenes for viewing by the driver 13. A periscope 27 comprising upper and lower planar mirrors 27a, 27b is used to couple light transferred by way of the left and right optical sections 23a, 23b to the Fresnel lens 26. Light that is coupled from the left and right side viewers 30a, 30b is reflected from left and right mirror surfaces 28a, 28b, respectively, of a roof mirror 28.

The left optical section 23a of the viewing system 10 comprises a left erecting prism 29a disposed at a leftmost end thereof that views the image scene on the left side of the vehicle 11. The term"erecting" is used to mean that the prism 29a provides the desired image orientation, i.e., left-to-right and up and down. Because the projector 20 is offset relative to the centerline of the vehicle 11, and because it is located in front of the driver 13, the right optical section 23b also includes a relay 31 positioned to the right of the centerline of the vehicle 11. The relay 31 has first and second Fresnel relay lenses 31a, 3b that couple the image scene between a right erecting prism 29b and the right mirror surface 28b, of the roof mirror 28.

The left Fresnel lens 32a is disposed adjacent to the left prism 29a and relays the left image scene from the left prism 29a to the left mirror surface 28a of the roof mirror 28. The right optical section 23b of the viewing system 10 comprises a right prism 29b disposed at a rightmost end thereof that views the image scene on the right side of the vehicle 11. The right Fresnel lens 32b is disposed adjacent to the right prism 29b and relays the right image scene from the right prism 29b to the right mirror surface 28b of the roof mirror 28 by way of the pupil relay 31.

FIG. 4 shows a full size top view of the side viewer 30 employed in the system 10 of FIG. 1. A housing secures the respective left and right Fresnel lenses 32a, 32b and left and right prisms 29a, 29b. The left and right prisms 29a, 29b each protrude outside of the housing. The prisms 29a, 29b are made of glass and have an index of refraction of 1.78. A window 33 is provided at each side of the vehicle 11 through which the external image scene is viewed by the prisms 29a, 29b.

In operation, the left side image scene observed by the left prism 29a is coupled by way of the left Fresnel lens 32a and the left mirror surface 28a, the lower and upper planar mirrors 27b, 27a of the periscope 27, and is collimated by the Fresnel lens 26 into the eyes of the driver 13. The right side image scene observed by the right prism 29b is coupled by way of the right Fresnel lens 32b through the second and first relay lenses 31b, 31a to the right mirror surface 28b to the lower and upper planar mirrors 27b, 27a of the periscope 27, and is collimated by the Fresnel lens 26 into an eyes of the driver 13.

In an embodiment of the system 10 that was reduced to practice, the system 10 was installed into a Buick LeSabre automobile. The following dimensional spacing between optical elements of the system 10 achieved the above-cited fields of view. The exit pupil 16 was located 24 inches from the Fresnel lens 26. The upper and lower planar mirrors 27a, 27b of the periscope 27 were separated by 7 inches. The center of the lower planar mirror 27b defined a centerlines of the left and right optical sections 23a, 23b. The Fresnel lens 26 had a focal length of 22 inches.

The roof mirror 28 was offset to the left of the centerline of the vehicle 11 by 12 inches. The outside edge of the left prism 29a was disposed 19 inches to the left of the centerline of the roof mirror 28. The outside edge of the right prism 29b was disposed 43 inches to the right of the centerline of the roof mirror 28. The second Fresnel relay lens 31b was positioned 13.5 inches to the left of the input surface of the right prism 29b. The first Fresnel relay lens 31a was positioned 13 inches to the left of the second Fresnel relay lens 31b.

Referring now to FIG. 5 illustrates a front end view of a second embodiment of a wide angle side viewing system 10 in accordance with the principles of the present invention that is installed in a bus 40. FIG. 6 illustrates a top view of the system 10 of FIG. 5. The second embodiment of the system 10 of FIG. 5 may also be used in a truck or boat, for example. The second embodiment of the system 10 is disposed on top of the dashboard 12 of the bus 40 does not require modification of the bus 40 nor does it protrude out of the cab of the bus 40.

The second embodiment of the system 10 comprises left and right side viewers 30a, 30b that respectively couple left and right side image scenes to left and right relays 31a, 31b. The viewers 30a, 30b on both sides of the bus 40 look out through existing windows of the bus 40. The left and right relays 31a, 31b respectively couple the left and right side image scenes to a field divider 42. The field divider 42 couples the left and right side image scenes upward to a projector 20, that projects the image scenes to a driver 13 of the bus 40.

Figure 7:
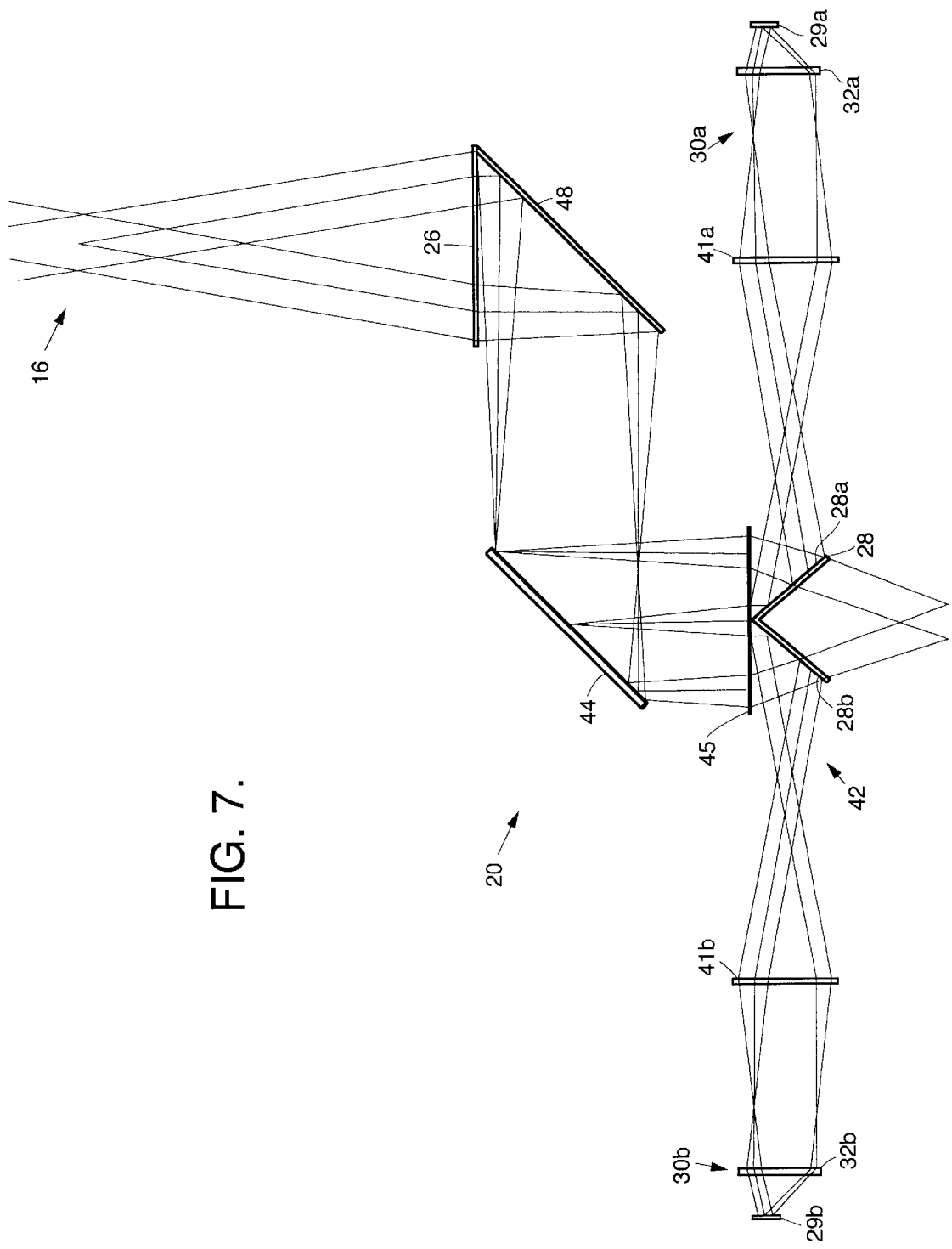
FIG. 7 illustrates an optical schematic of the viewing system of FIG. 5.

While the second embodiment of the system 10 is similar to the first embodiment, because of the longer distances required to relay the left and right side image scenes to the driver 13 and the large offset between the centerline of the bus 40 and the driver 13, additional optical components are required. In order to more fully understand the second embodiment of the system 10, FIG. 7 illustrates an optical schematic of the system 10 of FIG. 5.

The second embodiment of the system 10 comprises a projector 20 having a Fresnel lens 26 that is used to project the image scenes for viewing by the driver 13. The reflecting mirrors 44, 48 are used to couple light transferred by way of the field divider 42 to the Fresnel lens 26. A Fresnel lens 45 is disposed between the planar mirror 27b and left and right mirror surfaces 28a, 28b, respectively, of a roof mirror 28.

The left prism 29a is disposed at a leftmost end of the left optical section 23a and views the image scene on the left side of the bus 40. The left relay 31a is disposed between the left Fresnel relay lens 32a that is adjacent to the left prism 29a and the left mirror surface 28a of the roof mirror 28. The left relay 41a relays the left image scene from the left prism 29a to the left mirror surface 28a of the roof mirror 28. The right prism 29b is disposed at a rightmost end of the right optical section 23b and views the image scene on the right side of the bus 40. The right relay 41b is disposed between the right Fresnel relay lens 32b that is adjacent to the right prism 29b and the right mirror surface 28b of the roof mirror 28. The right relay 41b relays the right image scene from the right prism 29b to the right mirror surface 28a of the roof mirror 28.

The second embodiment of the system 10 has the left and right relays 41a, 41b positioned between the left and right prisms 29a, 29b and the periscope 27. The left and right relays 41a, 41b respectively couple the left and right image scenes between the left and right prism 29a, 29b and the left and right mirror surfaces 28a, 28b of the roof mirror 28.

In an embodiment of the system 10 that was reduced to practice, the following dimensional spacing between optical elements achieved the fields of view of 24° by 60° adjacent the left and right sides of the bus 40. The eyebox 16 was located 29 inches from the Fresnel lens 26. The horizontal centerlines of the reflecting mirror 48 and upper side-reflecting mirror 44 are located 7 inches from the Fresnel lens 26.

The center of the lower planar mirror 27b is 8.5 inches from the horizontal centerlines of the reflecting mirror 48 and upper side-reflecting mirror 44. The lower planar mirror 27b is disposed 4.5 inches away from the Fresnel lens 45. The Fresnel lens 45 had a focal length of 14 inches. The center of the roof mirror 28 was disposed on the centerline of the bus 40. The left and right relays 41a, 41b were disposed 26.8 inches laterally away from the centerline of the bus 40.

The outside edges of the left and right prisms 29a, 29b were disposed 46 inches from the centerline of the bus 40. Fresnel lenses 32a, 32b were disposed 3.5 inches away from the outside edges of the prisms 29a, 29b. The left and right relays 41a, 41b were positioned 14 inches to the away from the Fresnel lenses 32a, 32b.

The viewers 30a, 30b on both sides of the bus 40 look out through existing windows of the bus 40. The primary advantage of this present systems 10 is that they provide added perimeter viewing without requiring the driver 13 to turn his or her head away from a forward driving position. Driving safety is therefore increased when using the present invention.

Thus, side-viewing optical systems for use in vehicles, such as cars, busses, trucks and boats, and the like have been disclosed. It is to be understood that the described embodiments are merely illustrative of some of the many specific embodiments which represent applications of the principles of the present invention. Clearly, numerous and other arrangements can be readily devised by those skilled in the art without departing from the scope of the invention.

What is claimed is:

1. A wide angle, side viewing system for use with a vehicle, said system comprising:

a left side viewer that comprises a left prism disposed at a leftmost end thereof that views an image scene on the left side of the vehicle, and a left Fresnel relay lens is disposed adjacent to the left prism;

a right side viewer that comprises a right prism disposed at a rightmost end thereof that views the image scene on the right side of the vehicle, and a right Fresnel relay lens is disposed adjacent to the right prism;

a roof mirror having left and right mirror surfaces respectively disposed between the left and right side viewers for reflecting the left and right image scenes toward the driver;

a relay disposed between the right side viewer and the right mirror surface; and a projector comprising a Fresnel lens for projecting the left and right image scenes reflected by the left and right mirror surfaces of the roof mirror toward the driver for viewing.

2. The system of claim 1 wherein the projector is disposed adjacent a dashboard 12 and in front of the driver of the vehicle.

3. The system of claim 2 wherein the projector protrudes above the dashboard.

4. The system of claim 3 further comprising a periscope having upper and lower planar mirrors for coupling light between the left and right mirror surfaces of the roof mirror and the Fresnel lens.

5. The system of claim 1 wherein the prisms are comprised of glass.

6. The system of claim 1 wherein the prisms have an index of refraction of 1.78.

7. The system of claim 3 further comprising a second relay disposed between the left side viewer and the left mirror surface.

8. The system of claim 3 further comprising:

a field divider disposed between the relays;

a projector for receiving image scenes coupled by way of the field divider;

a reflecting mirror for reflecting the image scenes coupled by way of the projector; and a Fresnel lens for coupling the image scenes between the roof mirror and the projector.

* * * * *